US009555729B2

(12) United States Patent
Chen

(10) Patent No.: US 9,555,729 B2
(45) Date of Patent: Jan. 31, 2017

(54) CAR SEAT FOR PROTECTING VERTEBRAL COLUMN

(71) Applicant: Forsound Corp., Kaohsiung (TW)

(72) Inventor: Fu-Chieng Chen, Kaohsiung (TW)

(73) Assignee: FORSOUND CORP., Kaohsiung (TW)

( * ) Notice: Subject to any disclaimer, the term of this patent is extended or adjusted under 35 U.S.C. 154(b) by 23 days.

(21) Appl. No.: 14/657,499

(22) Filed: Mar. 13, 2015

(65) Prior Publication Data

US 2015/0183353 A1    Jul. 2, 2015

Related U.S. Application Data

(63) Continuation-in-part of application No. 13/826,510, filed on Mar. 14, 2013, now abandoned.

(51) Int. Cl.
| | |
|---|---|
| *A47C 7/02* | (2006.01) |
| *B60N 2/64* | (2006.01) |
| *B60N 2/70* | (2006.01) |
| *B60N 2/42* | (2006.01) |

(52) U.S. Cl.
CPC ............ *B60N 2/646* (2013.01); *B60N 2/4228* (2013.01); *B60N 2/4249* (2013.01); *B60N 2/643* (2013.01); *B60N 2/70* (2013.01)

(58) Field of Classification Search
CPC ..... B60N 2/646; B60N 2/4228; B60N 2/4249; B60N 2/643; B60N 2/70
USPC .......................... 297/452.29, 452.33, 452.35, 452.37, 297/452.41
See application file for complete search history.

(56) References Cited

U.S. PATENT DOCUMENTS

| | | | | |
|---|---|---|---|---|
| 2,855,986 A | | 10/1958 | Engelen | |
| 3,749,442 A | | 7/1973 | Berg et al. | |
| 4,753,480 A | * | 6/1988 | Morell ................... | A47C 7/022 297/452.27 |
| 5,369,829 A | * | 12/1994 | Jay ......................... | A47C 7/022 297/452.41 |
| 5,414,884 A | * | 5/1995 | Mackenzie ............ | A47C 7/022 297/284.1 |
| 5,513,899 A | * | 5/1996 | Michaels ............... | A47C 7/021 297/452.25 |
| 5,836,654 A | * | 11/1998 | DeBellis ................ | A47C 7/022 297/440.22 |
| 5,906,416 A | * | 5/1999 | Rasmussen ............ | A47C 7/40 297/284.3 |
| 6,367,106 B1 | * | 4/2002 | Gronsman ............. | A47C 4/54 5/655.3 |

(Continued)

*Primary Examiner* — Jose V Chen
(74) *Attorney, Agent, or Firm* — WPAT, P.C., Intellectual Property Attorneys; Anthony King

(57) ABSTRACT

Disclosed is a car seat for protecting vertebral column, comprising: a backrest and a seat, wherein there is disposed with a troughed recess at a central portion of each of the backrest and the seat, so that when the backrest and the seat are subject to external impact, the impact damage incurred by the backrest and the seat onto a human vertebral column may be avoided, and in this way the human vertebral column can therefore be protected; in an embodiment of the present invention, there further comprises a plurality of viscous elastomers disposed inside the backrest and the seat, these viscous elastomers are set up in a corresponding arrangement on two sides of a human vertebral column, so as to assist in biasing the muscle on the two sides of the vertebral column to cause less direct impact by the external force, and to provide a cushioning effect.

15 Claims, 15 Drawing Sheets

(56) References Cited

U.S. PATENT DOCUMENTS

| | | | | |
|---|---|---|---|---|
| 7,114,776 | B1 * | 10/2006 | Wiltberger | A47C 7/022 297/229 |
| 7,540,564 | B2 * | 6/2009 | Gokhale | A47C 7/425 297/230.14 |
| 7,607,738 | B2 | 10/2009 | Gregory et al. | |
| 8,566,987 | B1 * | 10/2013 | Burge | A47C 27/15 297/452.26 |
| 9,021,637 | B1 * | 5/2015 | Whelan | A61G 5/1043 297/452.25 |
| 2002/0000743 | A1 * | 1/2002 | Mori | B60N 2/2812 297/216.11 |
| 2003/0115658 | A1 * | 6/2003 | Stewart, III | A47C 7/425 2/94 |
| 2006/0170274 | A1 * | 8/2006 | Moule | B60N 2/643 297/452.25 |
| 2008/0079306 | A1 * | 4/2008 | Whelan | A47C 7/021 297/452.41 |
| 2008/0150337 | A1 * | 6/2008 | Bilak | A47C 7/462 297/230.1 |
| 2012/0299341 | A1 * | 11/2012 | Wyner | A41D 13/082 297/214 |

\* cited by examiner

CAR SEAT FOR PROTECTING VERTEBRAL COLUMN

CROSS-REFERENCE TO RELATED APPLICATIONS

This patent application is a continuation-in-part of U.S. patent application entitled, CAR SEAT FOR PROTECTING VERTEBRAL COLUMN, invented by Chen, Ser. No. 13/826,510, filed Mar. 14, 2013.

BACKGROUND OF THE INVENTION

1. Field of the Invention

The present invention relates to an apparatus for use in car seat, particularly for applications in cars, RVs, trucks, buses, container trucks, and other types of vehicles, for the purpose of securing safety of human vertebral column through the means of car seat.

2. Description of Related Art

Car continues to be a dominant mode of transportation for the modem society, and accounts for the most used vehicle for most people. The major function of a car seat aims to provide the rider a place to sit when riding a car, and in consideration of safety, car makers or car seat makers also spend a great amount of attention in taking deliberation in the safety of car seat, and its protection aspect for the riders.

In most car safety accident s, the main cause of casualty to passengers is due to the impact or collision against an external force, which leads to physical damage to human bodies, and the impact or collision affected on a human body can include collision by a human body to an object, or an object to a human body. The former situation can be avoided by using a safety belt to keep the passenger in a fixed position in the car seat, and for the latter there are many known techniques that can be used to protect the passengers from harm, for examples, air bags for cars, car seats and pillows capable of cushioning effect, in particular, pillow of car seat can also provide support to a person's neck, while also keep the neck from serious harm when the car is subject to external force collision from behind.

FIG. 1 herewith shows the anatomical structure of a human vertebral column. From a side perspective, the vertebral column has a visual appearance of a "S shape", including seven cervical vertebrae, twelve thoracic and five lumbar, one of sacrum and caudal below a lumbar. The structure of vertebral column resembles a circular column, connects to medulla, and extends from the foramen magnum to the location of the second lumbar. It is a thick nerve bundle, works to deliver information between the brain proper and other parts of the body, it meets the brain at the base of the skull, extends downward along the channel formed by the foramen. Muscle, blood vessels, and nerves are located in front and on two sides of the spine; the main function of the spine includes: supporting weight; guiding gravity so as to maintain body balance; and protecting spinal cord and nerve root to permit the brain to deliver information, or to accept information, and also protecting the neural system at the same time.

As shown in FIG. 2, under normal situations, when a passenger is in the car seat, the vertebral column 40 of a human body's back will collapse between the back muscles 41 on the two sides, the backrest 70 will be given priority to contact the back muscles 41 on the two sides of the vertebral column 40, the strength of the back is supported by the back muscle 41 on the two sides of the vertebral column 40. When the posture changes, especially when the car driver stretches arms to take command of the driver's wheel (as shown in FIG. 3), the back muscle 41 originally on the two sides of the vertebral column 40 will stretch toward the two sides, the vertebral column 40 on the back will at this time appear to be more protruding and will touch the back surface of the backrest 70. In this case, if the car is subject to considerable external force impact or collision, the backrest 70 will very likely cause a great deal of impact or collision to the back of the human body, and directly cause damages to the vertebral column 40.

In issued U.S. Pat. No. 2,855,986, entitled "SACRAL NERVE RELIEVING SEAT CUSHION BACK" (hereinafter Cited Reference 1), the Cited Reference 1 features, cited here in paraphrase, "My invention relates generally to seat cushions adapted for use primarily as a supplement to cushions of automotive vehicles. More particularly, my invention relates to improvements in automotive vehicle seat cushions of the type adapted to relieve pressure, strain and irritation to the lower portions of the spine and related areas including the sacral nerves, the prostate, and coccyx." One difference between the Cited Reference 1 and the current invention is that the Cited Reference 1 cites back-supporting section recesses 10 to be receptive for sacrum and caudal parts of a human body, not receptive for cervical vertebrae and thoracic parts. This difference shall be apparent to set the current invention apart from the prior art. The Cited Reference 1 installs recesses 10 on the back-supporting section 3 to only preclude the sacrum and caudal parts to directly press upon the back-supporting section 3. Oppositely, the current invention takes a different approach by way of serving as a storage for a whole-section vertebral column, to facilitate for a human body subject to severe collision force to recline into this invention's recess in a vehicle collision situation. The Cited Reference 1 cannot deliver this effect. Additionally, the troughed recess in the current invention extends to reach the pubis bone position of a human body, as opposed to in the case with the Cited Reference 1, the recesses 9 extend only to the front rim of the seat-forming section 2, making the front rim of the seat-forming section 2 a receptacle end. The derived structural effect is insufficient structural strength for sustaining weights.

Furthermore, the Cited Reference 1 does not use any elastomer on the back-supporting section 3 and the seat-forming section 2, therefore the Cited Reference 1 cannot reduce the regressive speed of the human body subject to collision. On the contrary with the current invention, two sides of the backrest's troughed recess is attached with elastomer. The elastomer works to mimic human muscle on the two sides of a human vertebral column. When the human body is subject to collision or impact to lead to the body's moving backward, the caudal part will expose itself. In an embodiment of the current invention, the caudal part will enter into the troughed recess of the backrest, embedding itself into the elastomer. In this case the elastomer works as a mechanical shock absorber to reduce the entry speed of the human vertebral column into the troughed recess, to prevent overreaching impact force from damaging the human vertebral column. This setup can also prevent the vertebral column from directly contact with the backrest. As a result, the elastomer disposed in the troughed recess and the two sides of the troughed recess shall be taken in entirety into context for the interpretation of the present invention's inventive scope.

In issued U.S. Pat. No. 7,607,738, entitled "CONTOURED SEAT AND METHOD" (hereinafter the Cited Reference 2), the Cited Reference 2, cited here in paraphrase, "A contoured seat generally includes a seat surface for supporting the thighs and buttocks of a sitter and a back surface for supporting the lower back of a sitter. Defined by the seat surface are a pair of bilateral, spaced protrusions that are positioned to extend into performs musculature of the sitter. Preferably, the seat surface is inclined at a 5° to 15°, and more preferably a 7.5°, angle to induce forward pelvic tilt in conjunction with lower lumbar support of a forward angle of the back surface. The seat and back surfaces may define a sacral-coccyx pocket that has a depth that varies, along its proximal-distal path to allow for sacral stabilization. The sacral-coccyx pocket preferably is relatively narrow and deep proximally and flares as it extends in the distal direction. A reinforcing ridge may extend across a top edge of the sacral-coccyx pocket to provide additional support." The Cited Reference 2 relates primarily to a seat, which is not literally disclosed or implied to coincide either with the current invention's vertebral column or pubis bone accommodating feature, nor with the disposition of elastomer on the two sides of a troughed recess. In its inventive scope, the Cited Reference 2 features a shock absorber system 26 disposed under the seat; the present invention does not cite such feature. The cited invention alone is not clear or suggestive to enable persons in the relevant technical art to arrive at the concept and realization of disposing elastomer on the two sides of troughed recess in the seat.

In issued U.S. Pat. No. 7,540,564, entitled "ERGONOMIC SYSTEMS AND DEVIES" (hereinafter the Cited Reference 3) cited here in paraphrase, "Ergonomic systems and devices are disclosed. In accordance with the embodiments of the invention, a system or device includes a traction surface that provides traction and/or support through contact with a portion of a user's body. For example, an ergonomic system includes a backrest cushion. The backrest cushion has a traction surface with a plurality of protruding traction pads for resting against a user's back and pulling along the user's back. The traction pads help stretch or decompress the user's spine through contact at multiple positions on the back and flanking the spine. In alternative embodiments of the invention, a chair, resting table, bed or other article of furniture includes one or more traction surfaces that provide traction through contact with one or more corresponding portions of a user's body." The Cited Reference 3 does not disclose disposition of a cerebral-cord-receiving recess. Rather the invention therein is primarily directed to disposing vertically numerous protruding traction pads 203 on the two sides of the vertebral column. The protruding traction pads are mainly used to stretching the human vertebral column, to help maintain the user in a normal sitting posture to avoid mis-positioned sitting postures and vertebral column damage. Against this prior art's feature, the current invention discloses disposition of elastomer on the two sides of troughed recess. The objective of disposing elastomer is not directed to providing guidance for a proper sitting posture. The elastomer is of a platelet form and is assembled on the two sides of the troughed recess. It is not of a block shape assembled on the two sides of the troughed recess. One current invention's approach is to use the elastomer as muscle of the two sides of a human vertebral column. When the human body is collided against or under impact to result in a recessive movement, an intervention answering to this physical influence includes using elastomer to absorb impact force as an initiative response measure. This setup is meant to reduce the entry speed of the human vertebral column's sinking into the troughed recess, to prevent impact force from overreaching a predetermined threshold, such that the human vertebral column can be protected from damage. This ceberal cord protective function would not be attainable if the current invention adopts the configuration cited in the Cited Reference 3.

In issued U.S. Pat. No. 3,749,442, entitled "SEAT HAVING RELATIVELY ADJUSTABLE SECTIONS" (hereinafter the Cited Reference 4) cited here in paraphrase, "A seat assembly having a base and two complementary seat elements supported thereon for individual yieldingly resisted universal tilting movement to accommodate to different positions of a user's body. The seat elements have recesses or apertures offset rearwardly from the universal connections for receiving the ischial tuberosity bones of the user, and the back of the seat has a localized recess for partial reception of the lumbar portion of the user's backbone. A peripheral upturned flange may be provided on the base in a relation enabling use of the assembly as a portable unit, to be removably positioned on a chair or the like, with the shiftable seat elements then being held by the flange against interfering contact with the chair. At the forward edges of the two shiftable seat elements, the assembly may be constructed to provide a more cushioned or yielding support than at other locations." Even though t—he seat in the Cited Reference 4 can be applied in automobile seat setting, the recess 56 located on the back of the seat cannot provide for accommodating the entire human vertebral column. The user's vertebral column would remain susceptible to collision against the back of the seat when the user is collided against. The recess cited in the Cited Reference 4 is designed to extend toward the edge of the seat. This setup can lead to seat's structural instability, weakening the weight support capability.

In collective view from the teaching that the Cited Reference 1 to the Cited Reference 4 altogether do not refer to car seat, it should be reasonable to deduce that the design principle throughout the Cited References 1 through 4 is not directed to dealing with protecting the vertebral column when the user is subject to an impact force. The design principle in the prior arts is entirely different from that adopted in the current invention. The troughed recess of the current invention is capable of aligning the vertebral column and the pubis bone for them to be mutually receptive. Even more, because the location of the troughed recess on the backrest in the current invention traverses along the shape of a human vertebral column to extend downward to reach the location of the pubis bone of a human body. This design emphasis for the vertebral column in the current invention is to avoid direct contact with the backrest and the seat when the user is under external impact, therefore effecting a protective function for the human vertebral column. This is not included in known car seat. The present invention therefore offers an inventive advantage not obvious to the persons of relevant art.

Furthermore, the Cited References 1 through 4 do not disclose troughed recess on the backrest that is structured to align with the location of pubis bone on a human body. Therefore when compared against the current invention, the prior arts cannot establish themselves to deliver identical effects. To be sure, the features of the current invention, including prevention against insufficient structural support and fitting of the vertebral column into the troughed recess when the vertebral column comes into contact with the backrest as a result of external impact, are made available by requiring the troughed recess on the backrest to align with the location of the pubis bone of a human body. These are not attained in the Cited References 1 through 4.

SUMMARY OF THE INVENTION

The present invention aims to provide a car seat for protecting vertebral column of a human body, which comprises a backrest and a seat, a portion that is close to the central portion of the backrest and the seat and corresponds a vertebral column of a human figure has a troughed recess.

In a preferred embodiment, the recess is located on a surface of a cushioning material that is made to comprise the backrest and the seat.

In another preferred embodiment, the cushioning material of the backrest and the seat is covered on their surface by a covering layer, the covering layer is thoroughly attached to the surface of the cushioning material and the recess, making the shape of the troughed recess visible at the position corresponding to the covering layer of the backrest and the seat.

In yet another embodiment of the present invention, the cushioning material for the backrest and the seat further comprises a covering layer, the covering layer works to cover upon the recess, the covering layer of the backrest and the seat work to present a planar surface at the position corresponding to the recess.

Another object of the present invention is to provide a car seat for protecting vertebral column, which comprises a backrest and a seat, the backrest and the seat are at least composed of a cushioning material, and a troughed recess is created near a central portion of the cushioning material that corresponds to a human vertebral column; a plurality of viscous elastomers, the viscous elastomer is disposed on the two sides of the troughed recess of the cushioning material of the backrest or the seat, and corresponds to the two sides of the human vertebral column.

In a preferred embodiment, the cushioning material of the backrest and the seat is covered on its outside by a covering layer, the covering layer is thoroughly attached to the surface of the cushioning material and the recess, making the shape of the troughed recess visible at the position of the backrest and the seat corresponding to the recess.

In another preferred embodiment, the cushioning material of the backrest and the seat are covered on its outside by a covering layer, the covering layer covers upon the recess, the covering layer of the backrest and the seat presents a planar surface at a position corresponding to the recess.

In a preferred embodiment, the viscous elastomer is made by a solid gel.

In yet another preferred embodiment, the viscous elastomer is made by a TPU.

Details of other functions and embodiments of the present invention will be described hereunder with the drawings.

BRIEF DESCRIPTION OF THE DRAWINGS

Prior Arts

Present Invention

Figure 1:
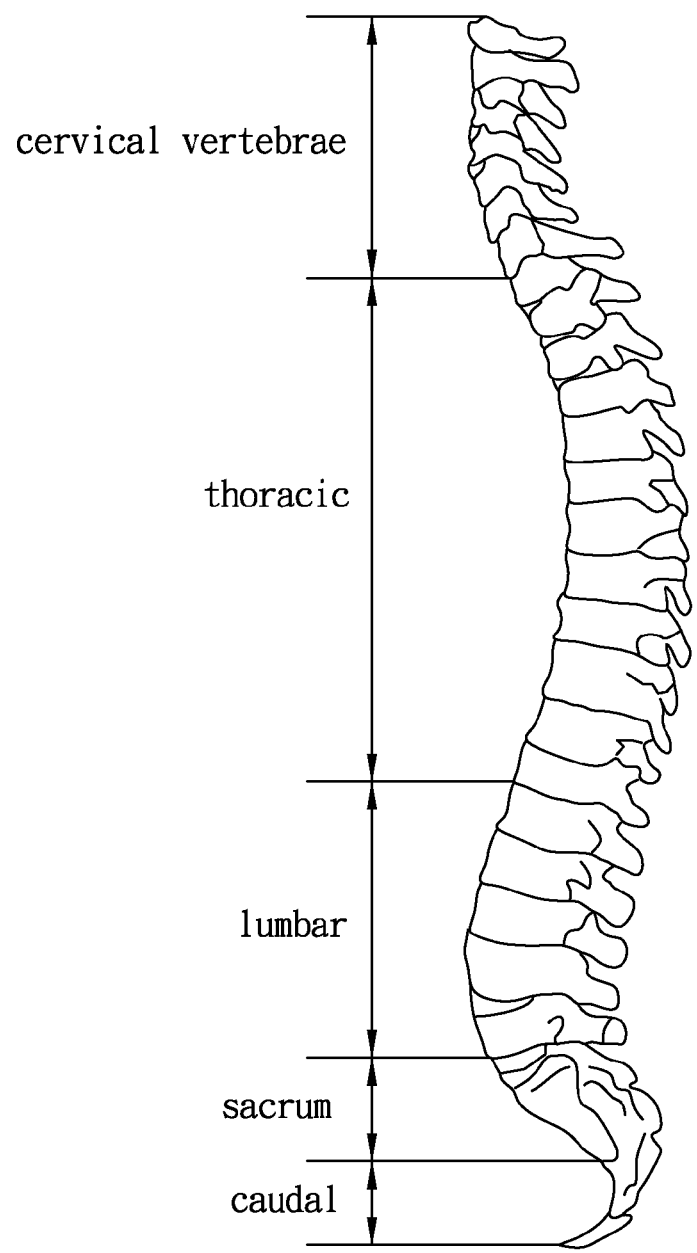
FIG. 1 is side anatomical view of a human vertebral column.
Figure 2:
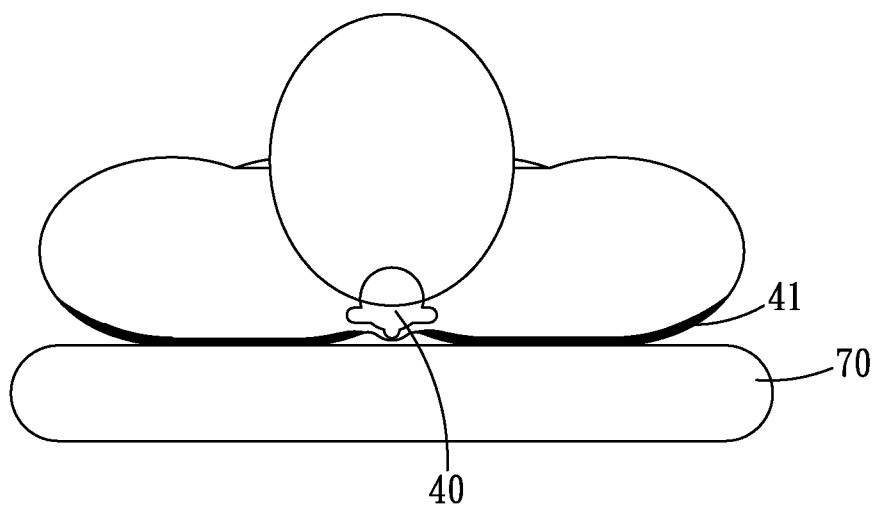
FIG. 2 shows a situation in which a human back reposes on a backrest, demonstrating the manner in which a vertebral column collapses between back muscles on two sides under normal conditions.
Figure 3:
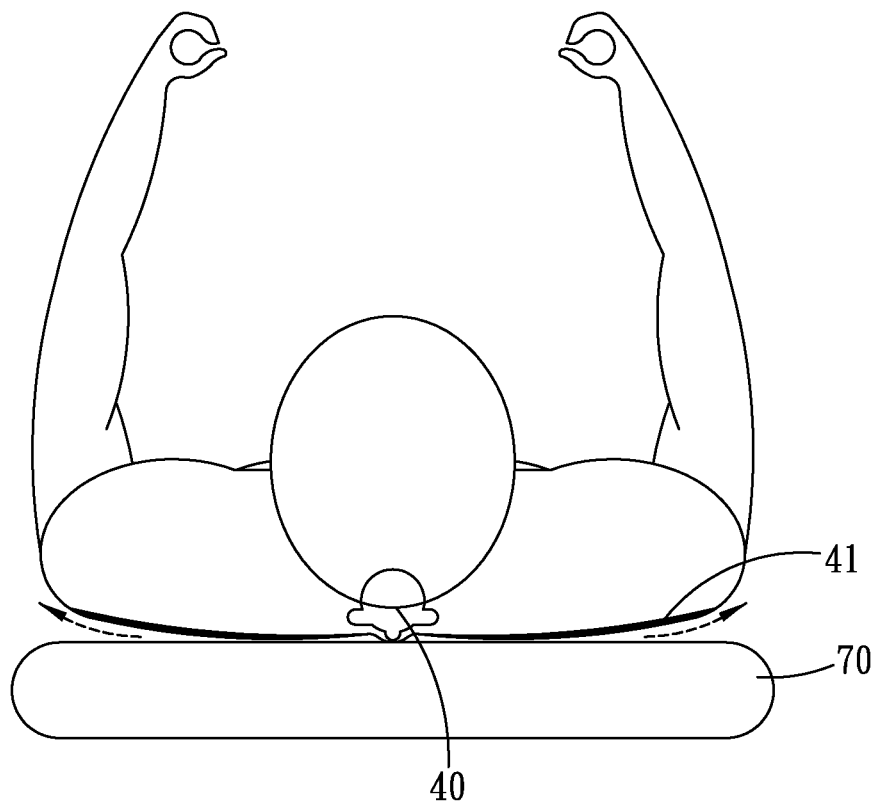
FIG. 3 shows a situation in which a human back reposes on a backrest, demonstrating the protruding appearance of the vertebral column and its contact with the backrest's surface when the subject stretches his/her arms.
Figure 4:
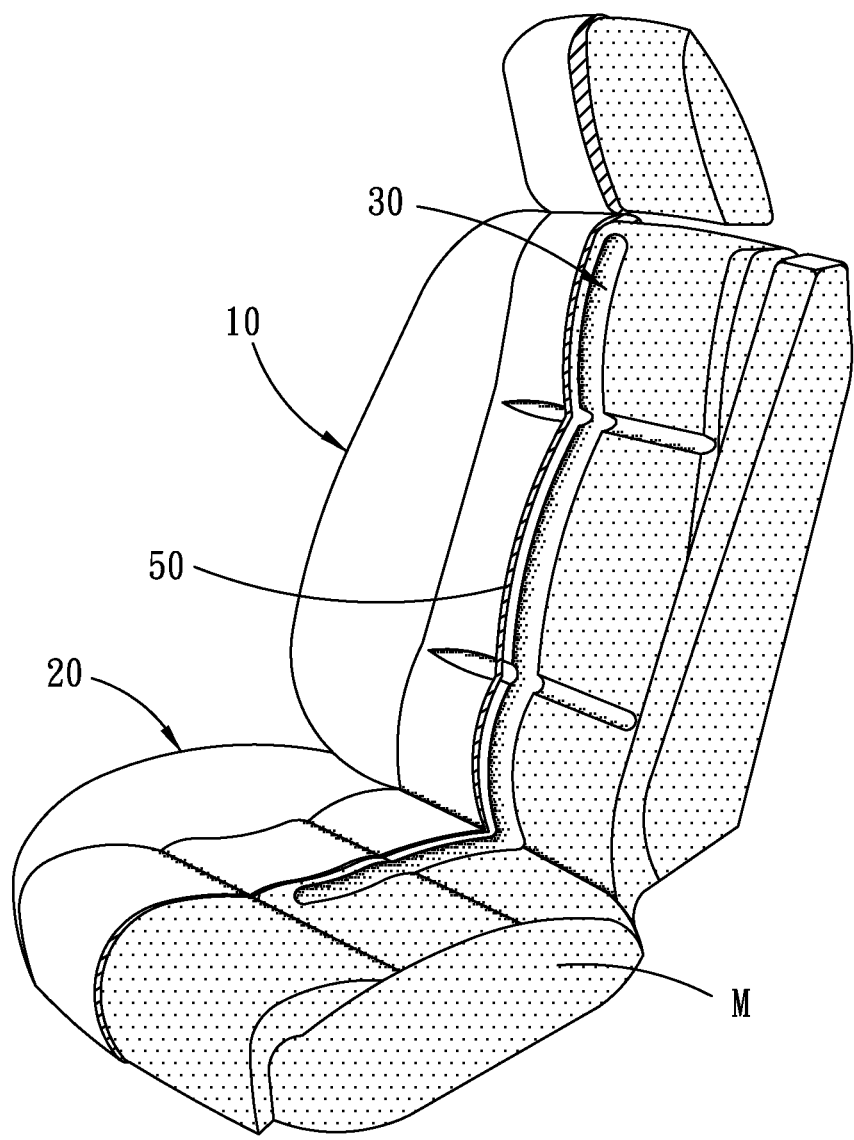

FIG. 4 shows cross-sectional view of an embodiment of the car seat for protecting vertebral column according to the present invention.

Figure 5:
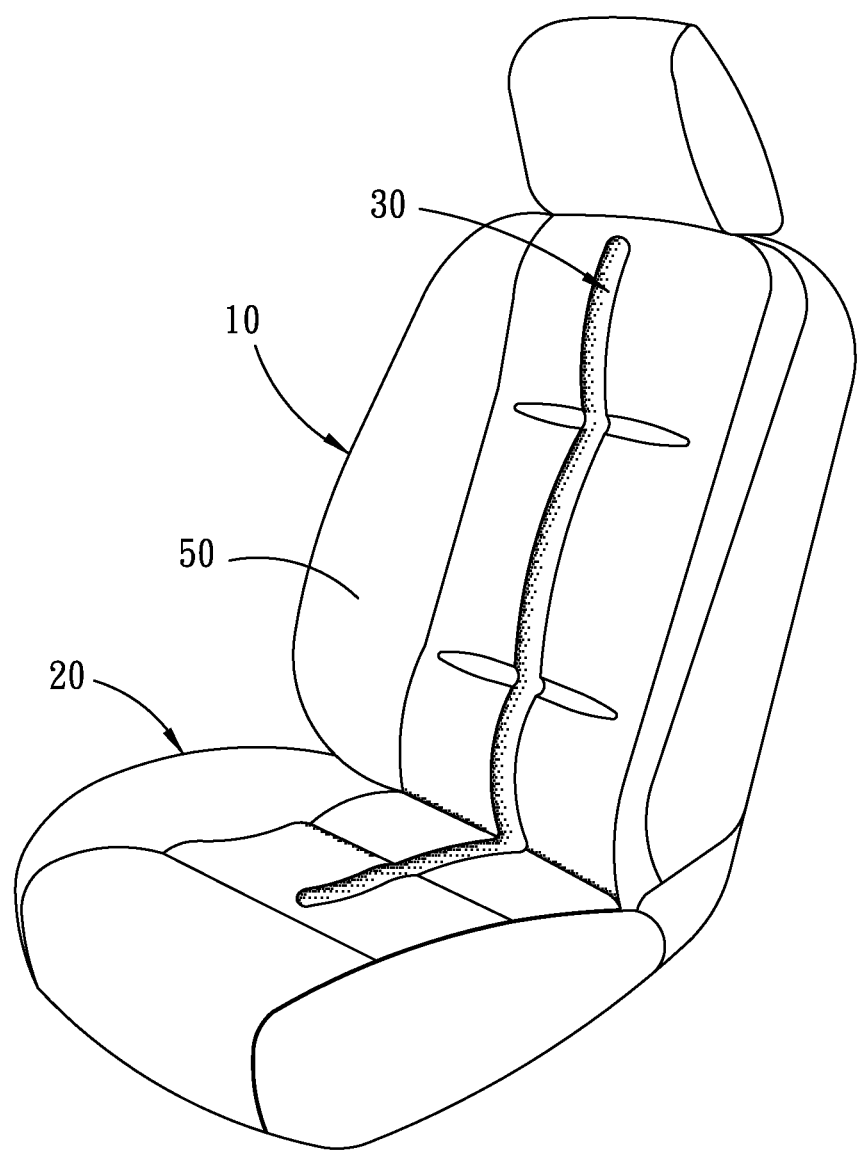

FIG. 5 shows the perspective view of an embodiment of the car seat for protecting vertebral column according to the present invention.

Figure 6:
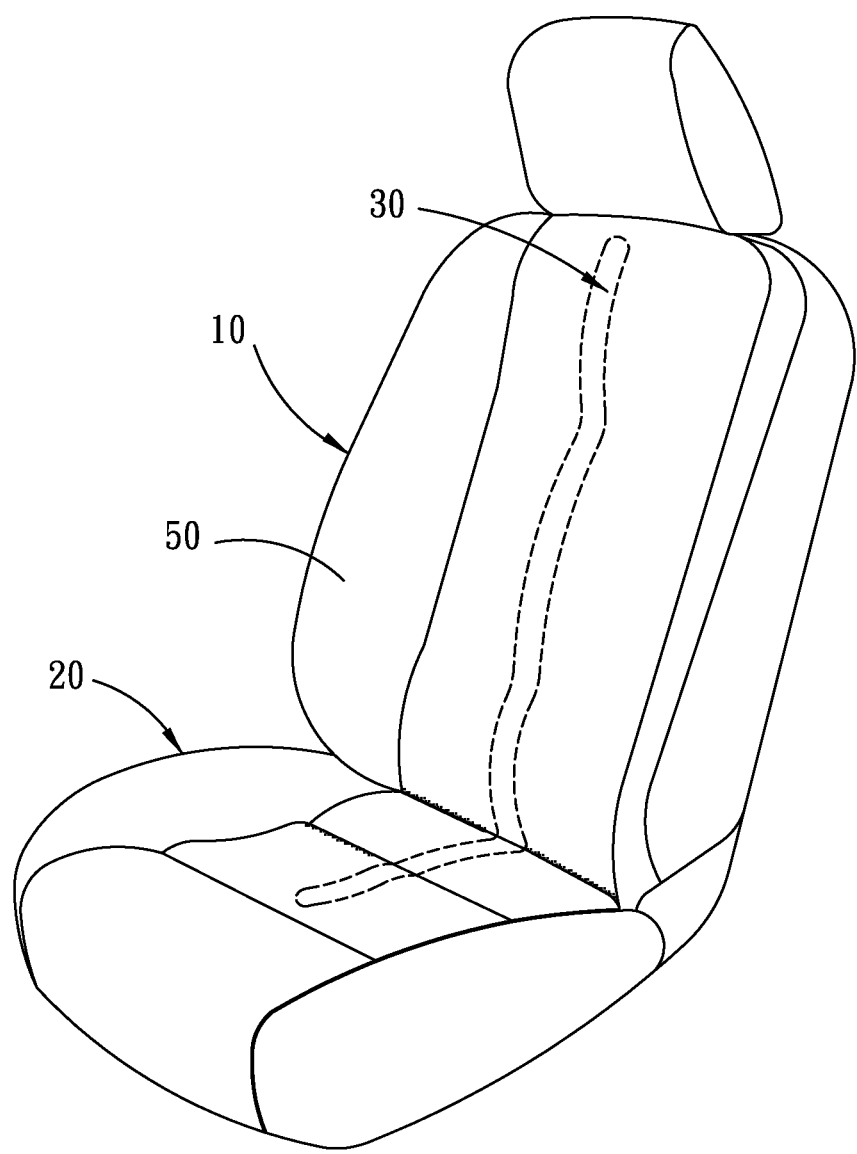

FIG. 6 shows the perspective view of another embodiment of the car seat for protecting vertebral column according to the present invention.

Figure 7:
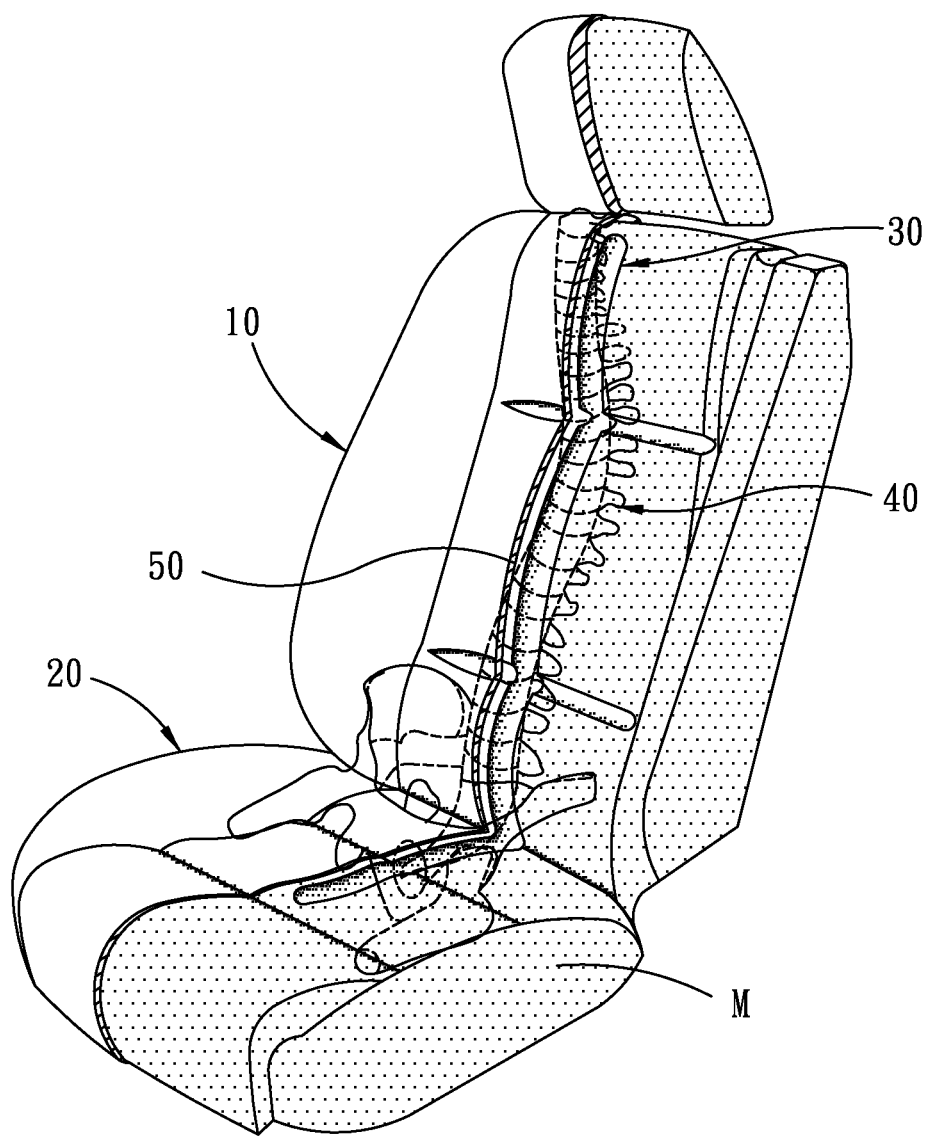

FIG. 7 is a diagram showing the use of a car seat for protecting vertebral column according to the present invention, demonstrating the communicating relationship between the human vertebral column and the recess.

Figure 8:
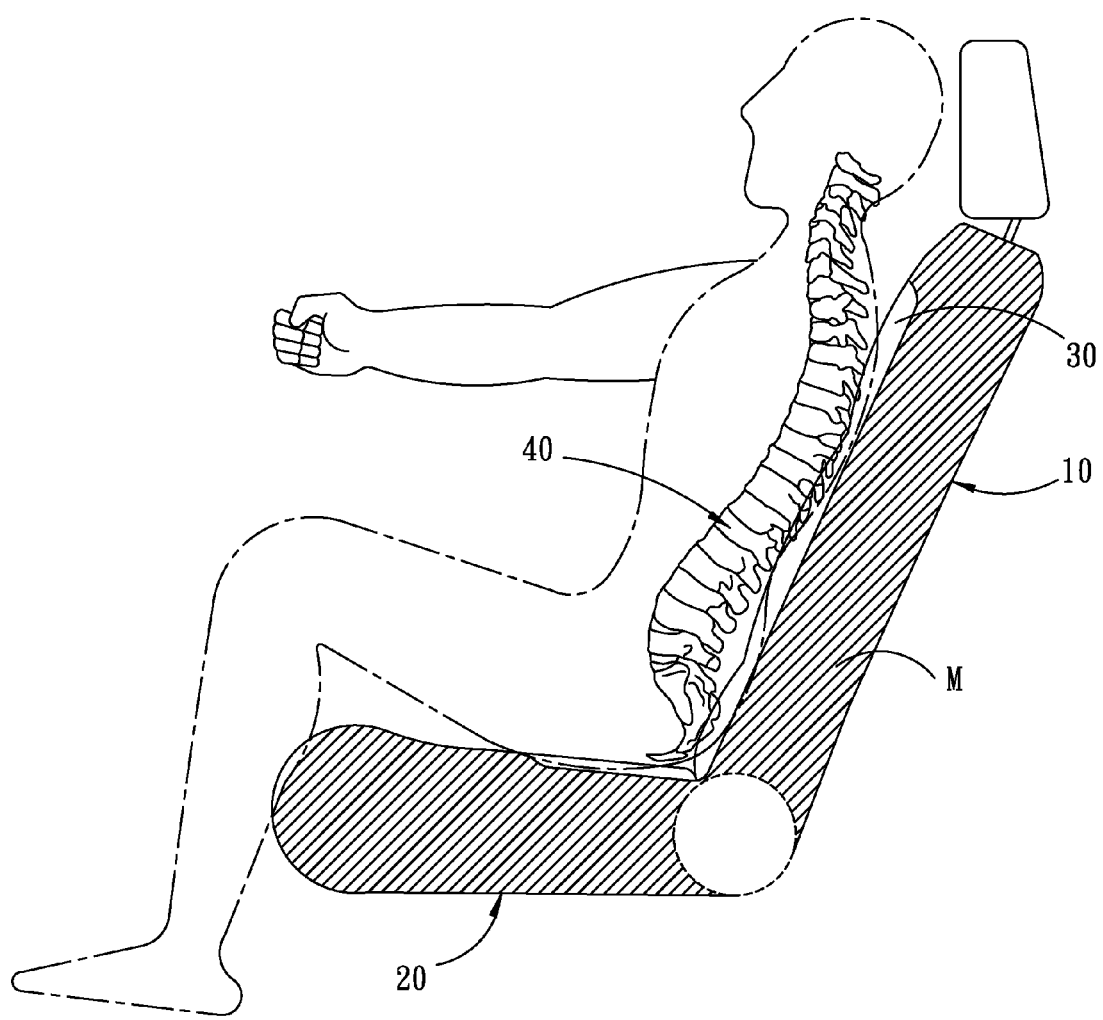

FIG. 8 is a diagram showing the use of a car seat for protecting vertebral column of the present invention, demonstrating the manner by which the human vertebral column collapses into the recess.

Figure 9:
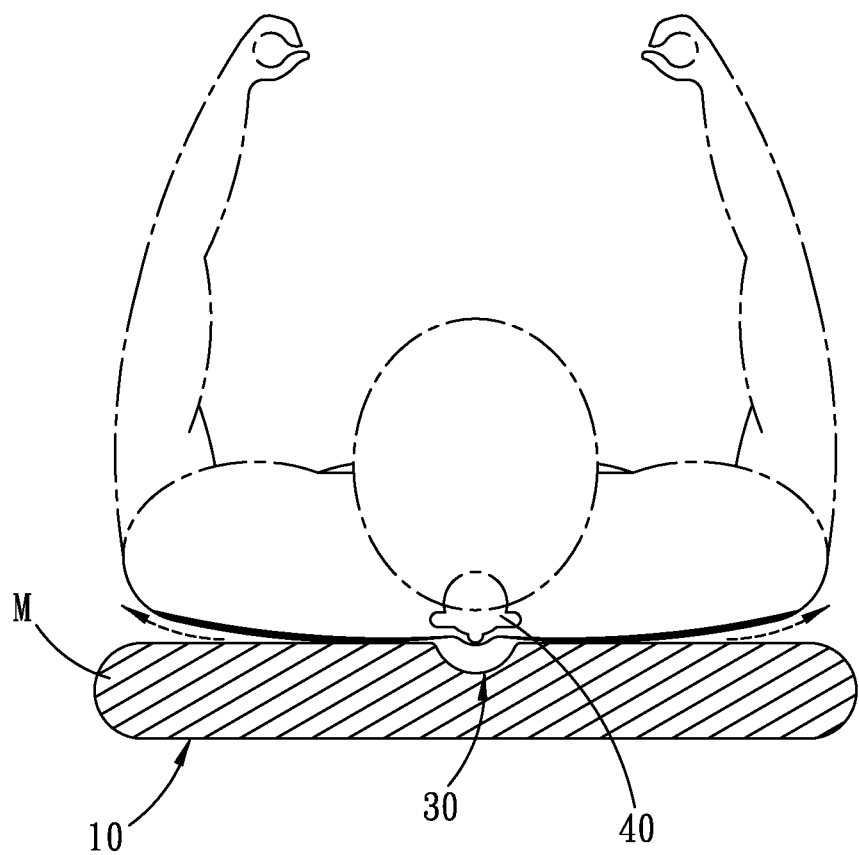

FIG. 9 is a diagram showing the use of the car seat for protecting vertebral column of the present invention.

Figure 10:
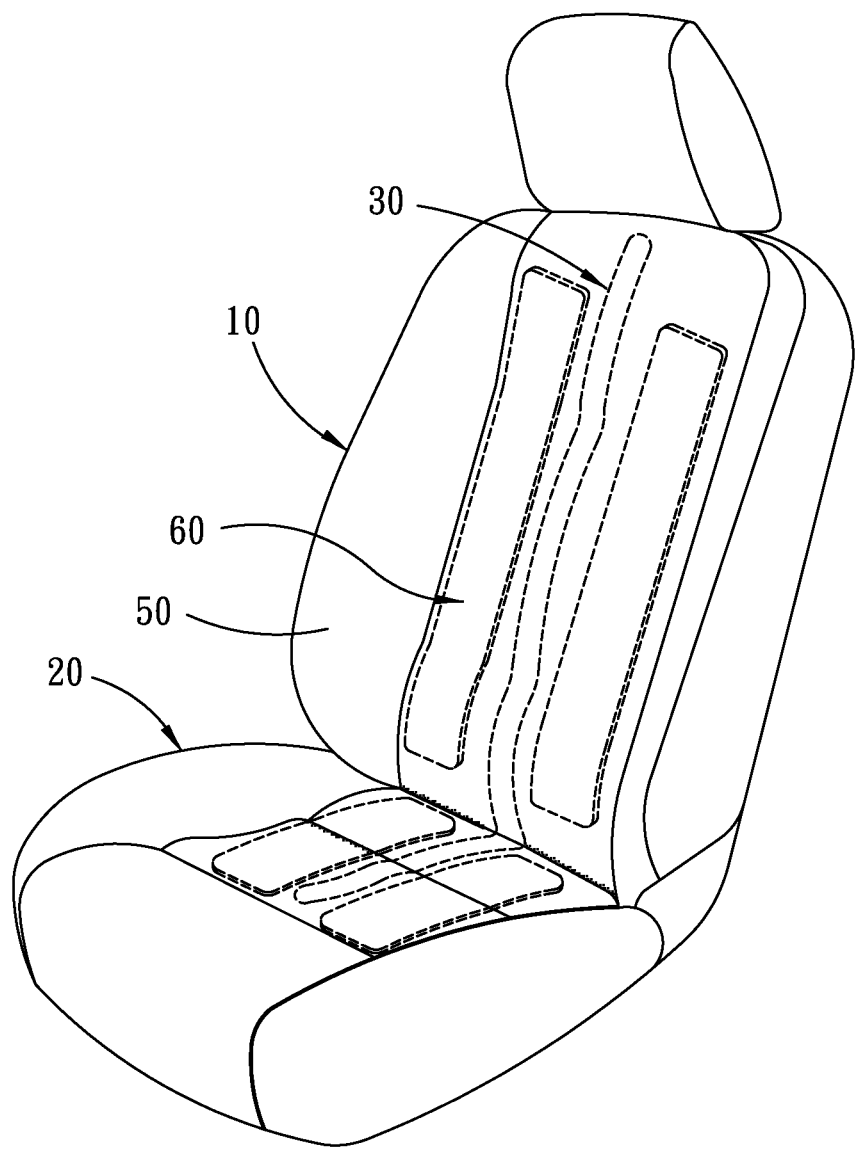

FIG. 10 shows a diagram for appearance structure of another embodiment of the car seat for protecting vertebral column of the present invention.

Figure 11A:
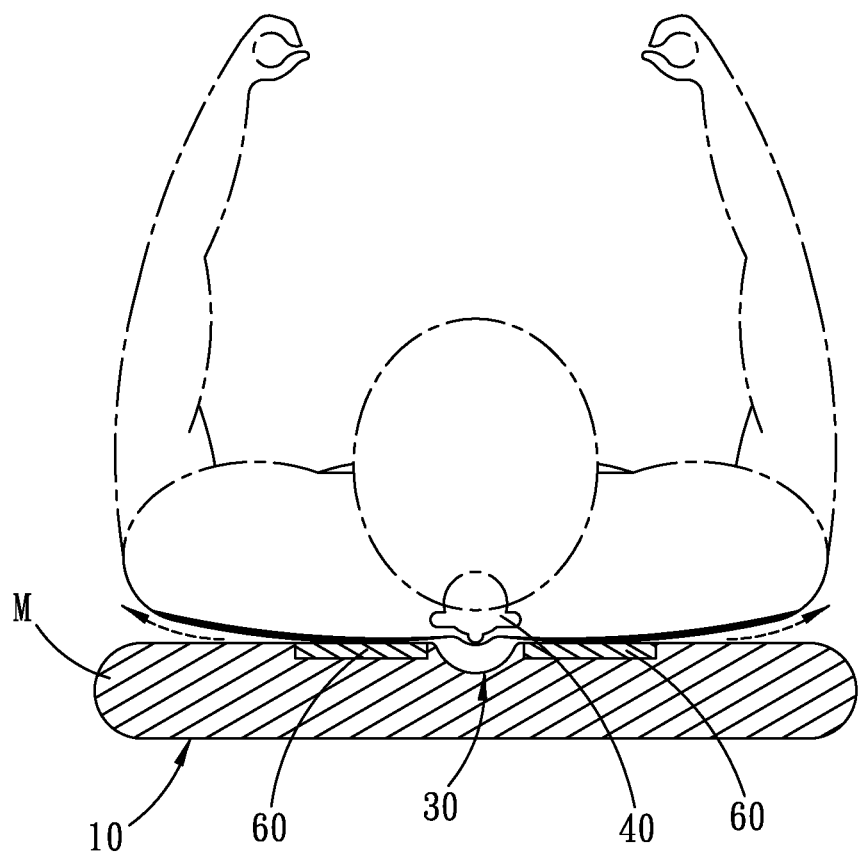
Figure 11B:
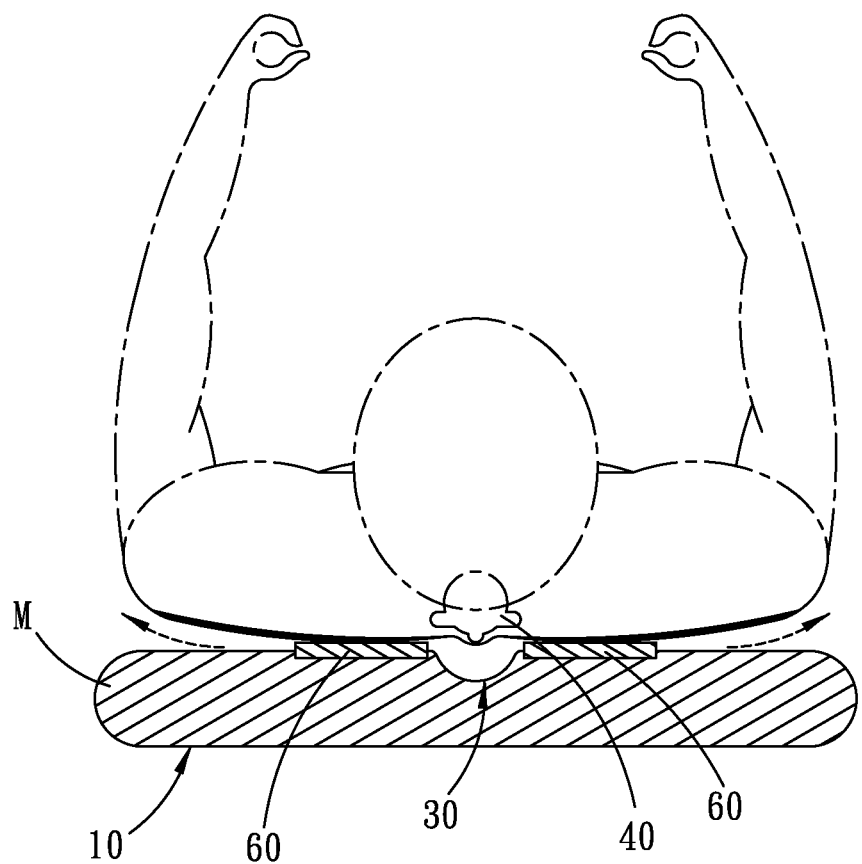

FIGS. 11A and 11B show a diagram for appearance structure of another embodiment of the car seat for protecting vertebral column of the present invention.

Figure 12A:
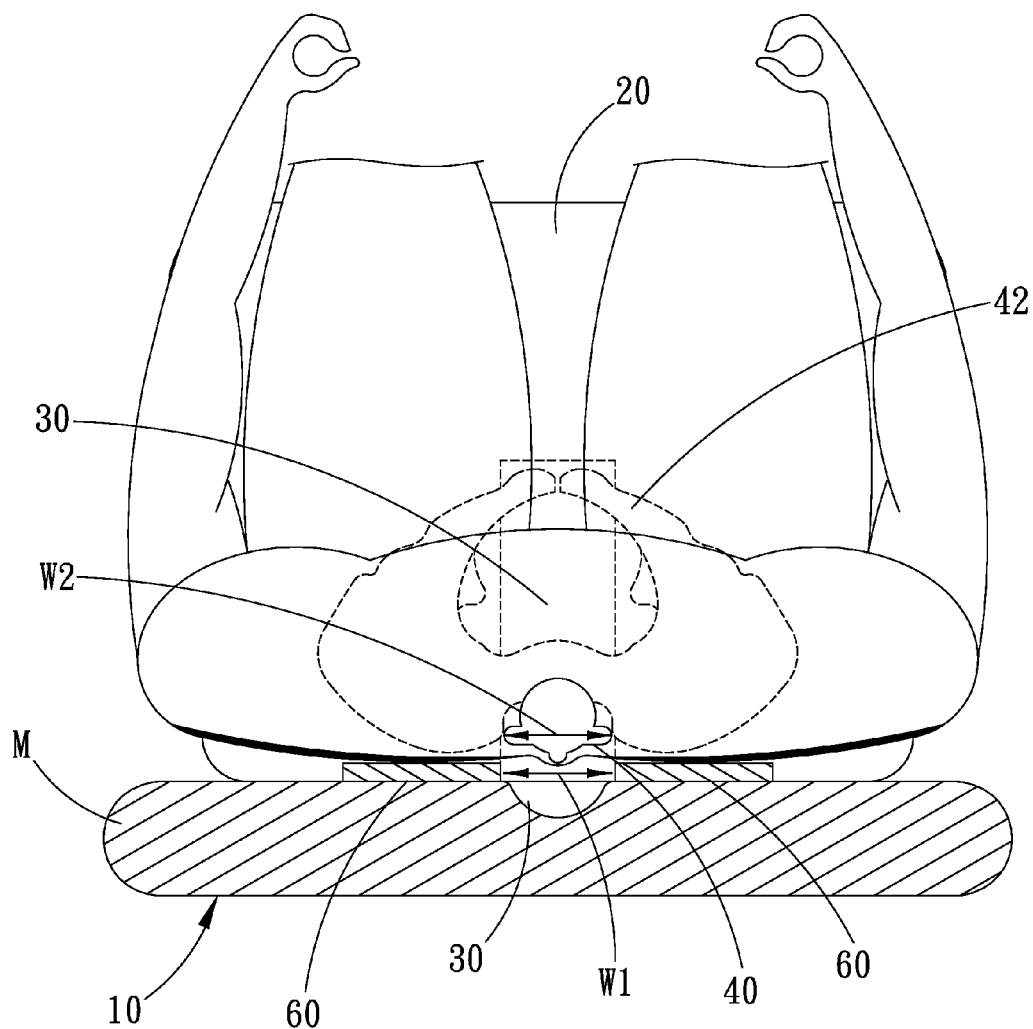
Figure 12B:
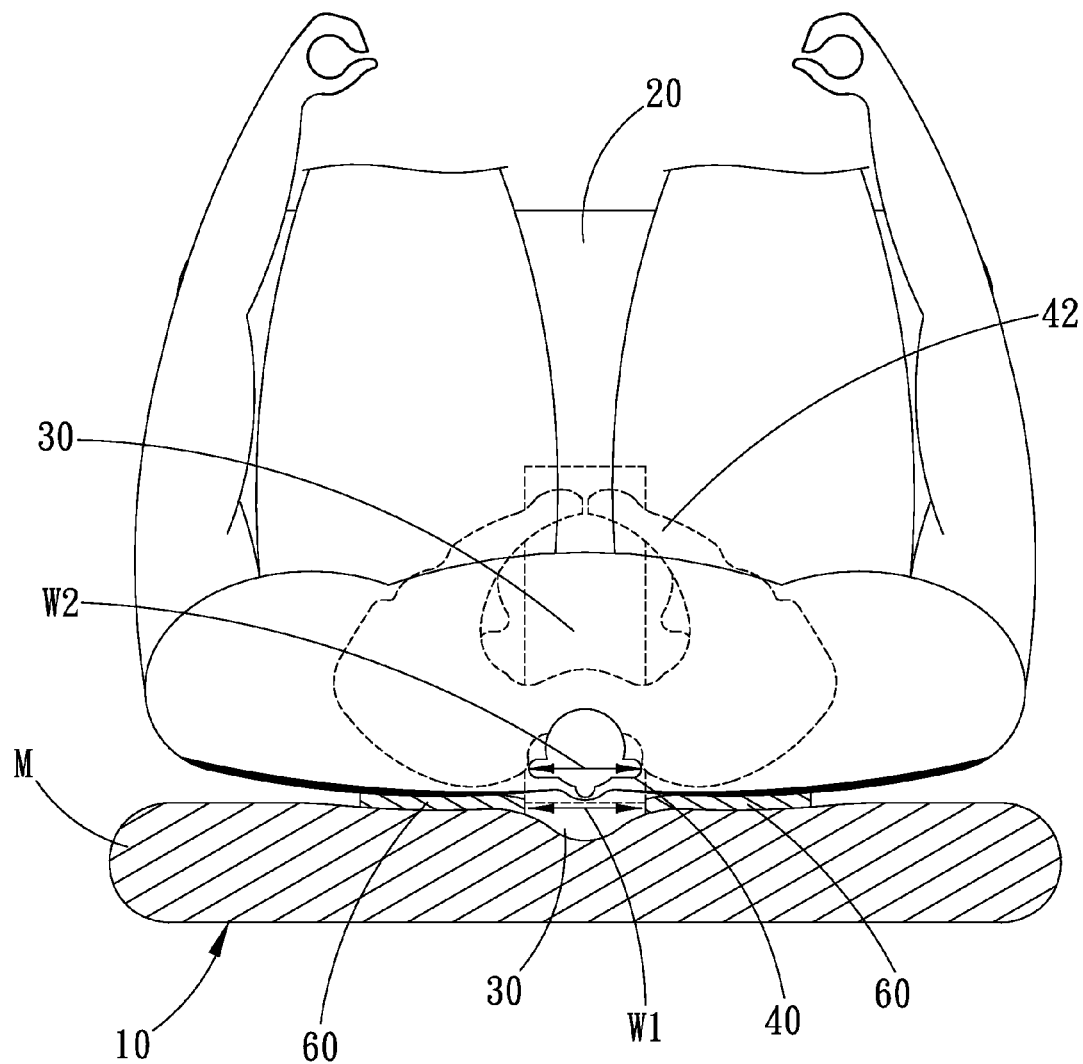

FIGS. 12A and 12B are diagrams for appearance structure of another embodiment of the car seat for protecting vertebral column of the present invention.

Figure 13:
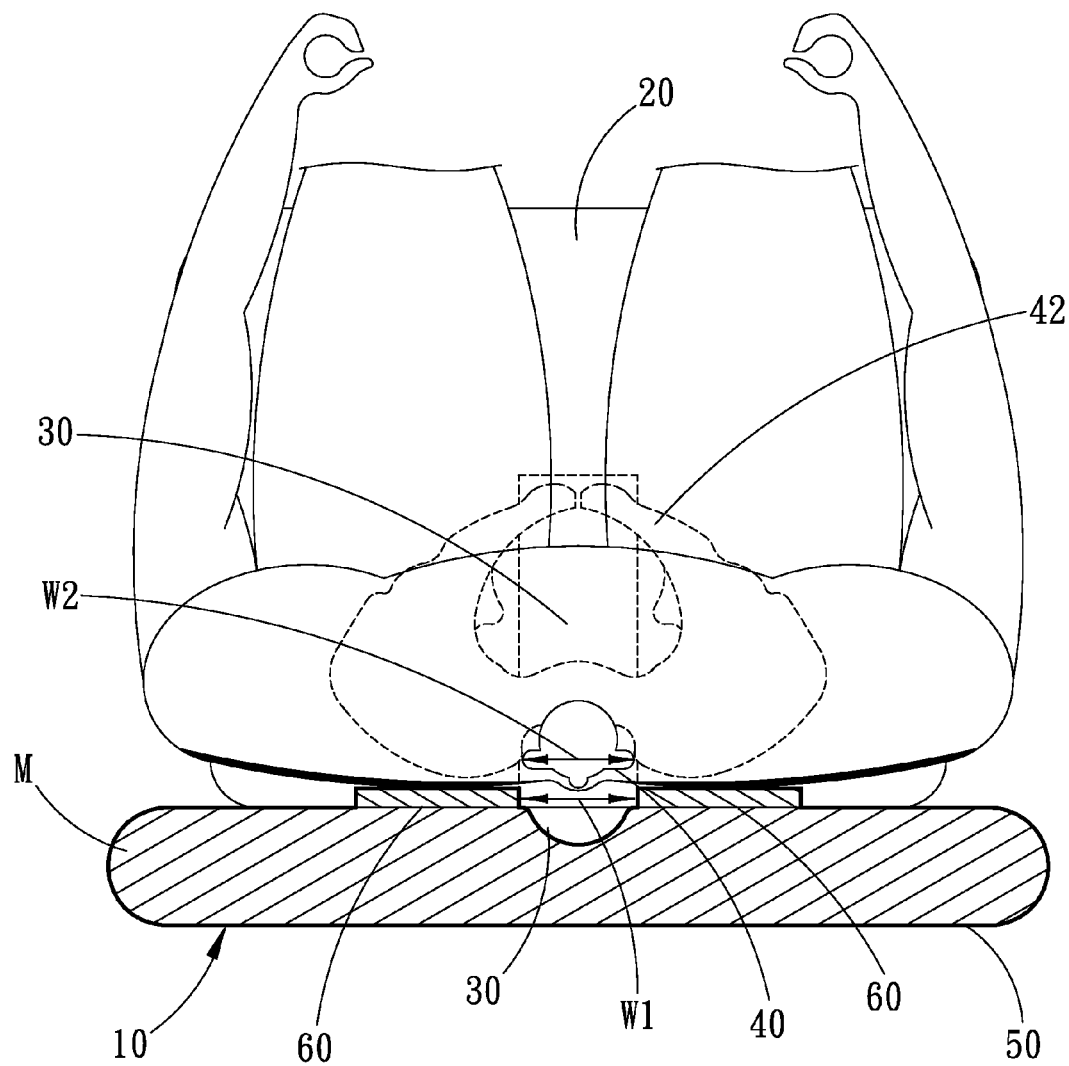

FIG. 13 is a diagram showing appearance structure of another embodiment of the car seat for protecting vertebral column of the present invention.

DETAILED DESCRIPTION OF THE PREFERRED EMBODIMENT

Referring now to FIG. 4, a structure for an embodiment for the car seat for protecting vertebral column of the present invention is disclosed, the car seat comprises: a backrest 10 and a seat 20, the backrest 10 and the seat 20 are composed of a cushioning material and a scaffold, wherein there is disposed with a troughed recess 30 at a position of the backrest 10 and seat 20 corresponding to a human vertebral column 40 (see FIG. 7), a mode of manufacturing for the recess 30 is direct molding or cast molding on a surface of the cushioning material M of the backrest 10 and seat 20, generally speaking, cushioning material M is usually a foam. Therefore, an embodiment of the present invention is to form a backrest 10 and seat 20 from a foam while at the same time directly form a recess 30 at a predetermined location by an integrated molding fashion. The recess 30 can extend on the backrest 10 along a human vertebral column 40 and downward a position on the seat 20 corresponding to the pubis bone 42 (see FIGS. 12A and 12B), when a human body is in a car seat, the arrangement can let the human vertebral column 40 to correspond to the recess 30, allowing the vertebral column 40 to collapse into the recess 30 (see FIG. 8 and FIG. 9), while keeping the backrest 10 and seat 20 from direct contact; even when the backrest 10 and the seat 20 are subject to collision of an external force, the arrangement can prevent the backrest 10 and the seat 20 from directly colliding against the human vertebral column 40, and further providing protection to the vertebral column 40.

In an embodiment of the present invention, the outside of the cushioning material M of the backrest 10 and seat 20 is covered by a covering layer 50, the material of the covering layer 50 can be selected from any of a fabric, a natural leather or a man-made leather, in an embodiment herein, the covering layer 50 is thoroughly attached onto the surface of the cushioning material M and the recess 30, making the shape of the troughed recess 30 still visible at the position of the covering layer 50 corresponding to the backrest 10 and the seat 20 (see FIG. 5); in another embodiment of the present invention, the covering layer 50 covers upon the recess 30, from a perspective view, the covering layer 50 of the backrest and the seat 20 presents a planar surface at a position corresponding the recess 30. (See FIG. 6).

FIG. 10 shows the structure of another embodiment of the car seat for protecting vertebral column of the present invention, which comprises a plurality of viscous elastomers 60 disposed on the backrest 10 and seat 20, these viscous elastomers 60 are disposed on the surface of the cushioning material M of the backrest 10 or seat 20, and are located on the two sides of the troughed recess of the backrest 10 or seat 20, and corresponds to the two sides of the vertebral column 40. The viscous elastomers 60 can be solid gels or thermoplastic polyurethane (also known as TPU) or soft thermosetting two-part polyurethane; the solid gels can be a polymer compound having excellent pressure dispensing and impact force absorbability, and can also be a copolymer, which can be thermoplastic, for example, it can be SEBS (hydrogenated styrene-butadiene-styrene block copolymer), and can be mixed processing with mineral oil work to form a flexible elastic colloid. Also, the hardness of solid gel can be adjusted depending on its demand, it can have low resilience, so can be especially adaptable for making highly soft cushions, and can be made to assist the muscles on the two sides of the vertebral column 40 to protect the vertebral column 40 to make direct collision by external force less likely, and to provide pressure buffering effect.

The TPU is an environmentally protective material; it does not contain plasticizers, and is characterized between rubber and plastic. Among the currently known rubber and plastic materials, the TPU has the most desirable physical property in terms of impact sustainability, bending sustainability, high extension sustainability, high anti-tearing strength and low temperature sustainability, and others.

The soft thermosetting two-part polyurethane used in the current invention is made of solid elastomer and prepared by mixing in a non-fixed weight ratio before injection molded into a platelet form under normal temperature.

As shown in FIG. 11A, the surfaces of the viscous elastomers 60, solid gels, TPU or soft thermosetting two-part polyurethane are approximately at the same level as the surfaces of the backrest 10 or seat 20.

As shown in FIG. 11B, the surfaces of the viscous elastomers 60, solid gels, TPU or soft thermosetting two-part polyurethane protrude from the surfaces of the backrest 10 or seat 20.

Another embodiment of the current invention is shown in FIGS. 12A and 12B, which shows that when a human body is positioned to lean onto the car seat of the present invention, the troughed recess 30 of the backrest and the vertebral column 40 are mutually receivable due in part to setting the car seat immovable. The width W1 of the troughed recess 30 is larger than the width W2 of the vertebral column 40 of the user. The joint between a human pubis bone 42 and another pubis bone 42 is mutually receivable with the troughed recess 30 on the seat 20. The backrest 10 and the two sides of the seat 20's troughed recess 30 are assembled together by an elastomer 60 to absorb mechanical shock and reduce pressure.

When the human body is subject to a collision force, the human body will normally move backward disproportionately. In the present invention, with the backrest 10 and the seat 20 fixated on the car, the entire body of the user will move proportionately in response to the collision force, cueing the vertebral column 40 and the pubic bone 42 to move correspondingly as a result of the human body recoiling back into its normal position. At this juncture of the entire physiological response mechanism, the muscle on the two sides of the vertebral column 40 will come into contact with the elastomer 60, damping the regressive movement of the vertebral column 40 and the pubis bone 42. In another aspect of this invention embodiment, the troughed recess 30 is designed to accommodate the vertebral column 40, this feature is meant to protect the vertebral column 40 from colliding onto the backrest 10. Based on the above design, it should be clear that the troughed recess 30 made on the backrest 10 and the seat 20 can deliver an advantageous feature to save the user's body from sustained compression on the vertebral column 40 and the pubis bone 42 during a prolonged sitting posture in a car, in addition to avoiding the vertebral column 40 and the backrest 10 from colliding against each other to lead into a vertebral column 40 injury, when the car is subject to vehicle collision. The troughed recess 30 on the seat 20 is structure in a such a way to accommodate for the position of pubic bone 42 on human bodies only, not made communicative to the rim of the seat 20. An effect of this configuration is enhanced total structural rigidity of the seat 20 and avoidance of insufficient support capability of the seat 20.

FIG. 13 shows yet another embodiment of the current invention. It distinguishes itself from the embodiments in FIGS. 12A and 12B by way of covering on the backrest 10 and the seat with a covering layer 50. This setup is meant to allow better sitting comfort for the user. All other structural elements in FIG. 13 are recited in FIGS. 12A and 12B, further elaboration is conserved and shall be directed to aforementioned description.

Although the present invention has been disclosed as the embodiments described above, those skilled in the art will appreciate that the conception may readily be utilized as a basis for the designing of other structures, methods and systems for carrying out the several purposes of the present invention without departing from the spirit and scope of the present invention. Therefore the claims of the patent for the present invention shall be governed by the claims appended herewith in the current specification.

What is claimed is:

1. A car seat for protecting vertebral column, comprising:
a backrest and a seat,
the backrest and the seat having a first surface and a second surface;
the backrest and the seat comprising at least a cushioning material, fixated on a car;
the cushioning material comprising a foam;
the backrest and a seat comprising a portion near a center of cushioning material that corresponds to a human vertebral column is disposed with a troughed recess, where the width of the troughed recess is larger than the width of the vertebral column, and the location of the troughed recess on the backrest traverses along the shape of the vertebral column to extend downward to the seat; and
a plurality of viscous elastomers,
wherein the plurality of viscous elastomers having a first viscous elastomer, a second viscous elastomer, a third viscous elastomer and a fourth viscous elastomer,
wherein the first viscous elastomer and the second viscous elastomer are disposed on the backrest, wherein the first viscous elastomer is disposed on a first side of the troughed recess and the second viscous elastomer is disposed on a second side of the troughed recess, wherein the third viscous elastomer and the fourth viscous elastomer are disposed on the seat, wherein the third viscous elastomer is disposed on the first side of the troughed recess and the fourth viscous elastomer is disposed on the second side of the troughed recess, wherein each of the first viscous elastomer, the second viscous elastomer, the third viscous elastomer and the fourth viscous elastomer having a rectangular shape, wherein each of the first viscous elastomer, the second viscous elastomer, the third viscous elastomer and the fourth viscous elastomer having a longitudinal axis parallel to a longitudinal axis of the troughed recess, wherein the first viscous elastomer and the second viscous elastomer both having a length greater than half of a length of the backrest.

2. The car seat for protecting vertebral column of claim 1, wherein the cushioning material of the backrest and the seat is covered on the outside by a covering layer, the covering layer is thoroughly attached on a surface of the cushioning material and the recess, such that a shape of the troughed recess remains visible through the covering layer at a position corresponding to the backrest and the seat.

3. The car seat for protecting vertebral column of claim 1, further comprising a covering layer covering the outside of the cushioning material of the backrest and the seat, wherein the covering layer covers upon the recess, a portion of the covering layer of the backrest and the seat communicate with the recess to present a planar surface.

4. The car seat for protecting vertebral column of claim 1, wherein each of the plurality of viscous elastomers has a first surface and a second surface, and the first surfaces of the plurality of viscous elastomers are at the same level as the first surface of the backrest or seat.

5. The car seat for protecting vertebral column of claim 1, wherein each of the plurality of viscous elastomers has a first surface and a second surface, and the first surfaces of the plurality of viscous elastomers protrude from the first surface of the backrest or seat.

6. The car seat for protecting vertebral column of claim 1, wherein the viscous elastomers are made of solid gels.

7. The car seat for protecting vertebral column of claim 6, wherein the solid gels can be made of polymer compounds having excellent pressure dispensing and impact force absorbability, and can be made of a copolymer, which is a flexibly elastic gel formed by SEBS (hydrogenated styrene-butadiene-styrene) mixed processing with mineral oil.

8. The car seat for protecting vertebral column of claim 6, wherein each of the solid gels has a first surface and a second surface, and the first surfaces of the solid gels are at the same level as the first surface of the backrest or seat.

9. The car seat for protecting vertebral column of claim 6, wherein each of the solid gels has a first surface and a second surface, and the first surfaces of the solid gels protrude from the first surface of the backrest or seat.

10. The car seat for protecting vertebral column of claim 1, wherein the plurality of viscous elastomers is made of TPU.

11. The car seat for protecting vertebral column of claim 10, wherein the TPU has a first surface and a second surface, and the first surface of the TPU is at the same level as the first surface of the backrest or seat.

12. The car seat for protecting vertebral column of claim 10, wherein the TPU has a first surface and a second surface, and the first surface of the TPU protrudes from the first surface of the backrest or seat.

13. The car seat for protecting vertebral column of claim 1, wherein the viscous elastomer is soft thermosetting two-part polyurethane.

14. The car seat for protecting vertebral column of claim 1, wherein the plurality of viscous elastomers is made of soft thermosetting two-part polyurethane and is disposed at the same level of the first surface of the backrest and the seat.

15. The car seat for protecting vertebral column of claim 1, wherein the plurality of viscous elastomers is made of soft thermosetting two-part polyurethane and protrudes from the first surface of the backrest and the seat.

\* \* \* \* \*